United States Patent [19]
Johnson et al.

[11] Patent Number: 5,697,436
[45] Date of Patent: Dec. 16, 1997

[54] PROPORTIONAL WITH VARIABLE BIAS BATCH REACTOR TEMPERATURE CONTROL SYSTEM

[75] Inventors: William Harold Johnson, Fortescue, N.J.; Frederick William Meckley, Wilmington, Del.; Breydon Gregory Morton, Sicklerville, N.J.

[73] Assignee: E. I. Du Pont de Nemours and Company, Wilmington, Del.

[21] Appl. No.: 551,980

[22] Filed: Nov. 2, 1995

Related U.S. Application Data

[63] Continuation-in-part of Ser. No. 425,949, Apr. 19, 1995, abandoned.

[51] Int. Cl.$^6$ ............... F25D 17/02; G05D 15/00
[52] U.S. Cl. ............... 165/254; 62/201; 236/78 D; 364/137
[58] Field of Search ............... 236/78 D; 165/254, 165/292; 364/137; 62/201

[56] References Cited

U.S. PATENT DOCUMENTS

| | | | |
|---|---|---|---|
| 4,744,408 | 5/1988 | Pearson et al. | 165/254 |
| 4,925,089 | 5/1990 | Chaparrd et al. | 236/78 D |
| 5,091,844 | 2/1992 | Waltz | 364/153 |
| 5,153,807 | 10/1992 | Saito et al. | 364/165 |
| 5,170,341 | 12/1992 | Sklaroff | 364/162 |
| 5,200,681 | 4/1993 | Hiroi | 318/610 |
| 5,207,379 | 5/1993 | Hurmi et al. | 236/9 |
| 5,208,744 | 5/1993 | Kanda | 364/162 |
| 5,291,390 | 3/1994 | Sauou et al. | 364/148 |

OTHER PUBLICATIONS

Instrumentation for Process Measurement and Cotrol Norman Anderson, 1974 pp. 158, 159.

*Primary Examiner*—William E. Wayner

[57] ABSTRACT

An improved method of controlling the temperature of a batch reactor employing a cascaded master and slave controller architecture wherein the temperature of the reactor serves as the measured variable, $MV_1$, in the master loop and the jacket temperature serves as the measured variable, $MV_2$, in the slave loop and the feedback for the master loop, $FB_1$, is intentional set equal to this measured variable, $MV_1$, or to the master controller set point, $SP_1$, corresponding to the temperature of the reactor thus inherently creating a bias feedback and proportional variable reset (PVR). The novel PVR temperature control system is useful in alleviating product variability caused by temperature control variation during heat, cod and hold steps.

4 Claims, 5 Drawing Sheets

PROPORTIONAL WITH VARIABLE BIAS BATCH REACTOR TEMPERATURE CONTROL SYSTEM

This is a continuation-in-part of application Ser. No. 08/425,949, filed Apr. 19, 1995, now abandoned.

BACKGROUND OF THE INVENTION

1. Field of the Invention

This invention relates to an improved method of controlling temperature in a jacketed batch reactor. More specifically but not by way of limitation, the invention relates to a novel control strategy and associated control algorithm that employs master (outer) and slave (inner) control loops in a cascaded arrangement with a master controller process variable used as a variable bias in the control algorithm.

2. Description of the Related Art

The normal engineering practice to deal with a tempered heating/cooling control problem is to install a cascaded control system. In such a situation the slave controller (i.e., the inner control loop) involves the temperature of the jacket heat-exchange fluid and the master controller (i.e., the outer control loop) involves the temperature of the reactor/reaction. Typically the slave controller uses a proportional integral (PI) control algorithm and controls the temperature of the heating/cooling media flowing through the reactor jacket. The master loop uses a proportional integral derivative control algorithm (PID) and controls reactor temperature. Since the controller tuning required to heat/cool as fast as possible is much different from the tuning required to hold the reactor temperature at set point, a sacrifice is normally required which inhibits control system performance. An alternative method uses a nonlinear control algorithm for the master controller and a proportional integral algorithm for the slave loop. While this method is satisfactory, it is too complex for instrument maintenance groups to calibrate and usually ends up being operated in manual mode. Another draw back is that both methods consist of three or more parameters within the master controller which require routine tuning to ensure system performance. This can typically exceed the technical capabilities of most instrument maintenance groups.

SUMMARY OF THE INVENTION

In view of the above, the present invention provides an improved method of controlling the temperature of a batch reactor comprising the steps of:

(a) providing a jacketed batch reactor with circulating heat-exchange fluid in the jacket surrounding the reactor and a reaction mass in the reactor, a means for heating said circulating heat-exchange fluid, a means for cooling said circulating heat-exchange fluid, a means for circulating said heat-exchange fluid to supply or withdraw heat from the reaction mass, a pair of matched temperature sensors, wherein the first temperature sensor monitors the temperature of said reaction mass in said reactor and the second temperature sensor monitors the temperature of the heat-exchange fluid in the jacket and both of said temperature sensors are operative over the same full temperature range of the reaction, a primary and slave proportional controller means arranged in a cascaded relationship, wherein said master controller is responsive to the temperature of said reaction mass by operative communication with said first temperature sensor and wherein said slave controller is responsive to the temperature of said heat-exchange fluid by operative communication with said second temperature sensor, and (b) utilizing a cascaded master and slave controller means for controlling the temperature of said reactor wherein the temperature of the reactor monitored by said first temperature sensor serves as the measured variable, $MV_1$, in the master loop and the jacket temperature monitored by said second temperature sensor serves as the measured variable, $MV_2$, in the slave loop and the feedback for the master loop, $FB_1$, is set equal to said measured variable, $MV_1$, or the master controller set point, $SP_1$, thus creating a proportional variable reset.

In one embodiment of the invention, the controller circuit involves a digital electronic controller or corresponding analog electronic controller and in another embodiment a pneumatic controller is employed.

Thus, it is the primary object of the present invention to provide an improved temperature control system and associated proportional with variable bias algorithm that will allow for the heating as rapidly as physically possible during temperature ramp steps yet simultaneously allows for virtually no temperature overshoot or undershoot and will maintain a temperature control setpoint during a subsequent hold period. It is a further object to provide a temperature control system that affords the operator the ability to time the temperature control by setting only one parameter (i.e., turning only one control knob) which leads to simplicity and ease of operation. Fulfillment of these objects and the presence and fulfillment of additional objects will become apparent upon complete reading of the specification and drawing in combination with the attached claims.

BRIEF DESCRIPTION OF THE DRAWING

FIG. 2 is a set of three segments of temperature recordings during the actual use of the improved temperature control method according to the instant invention while running a polymerization reaction in a jacketed reactor as shown in FIG. 1, wherein

DESCRIPTION OF THE PREFERRED EMBODIMENTS

Figure 1:
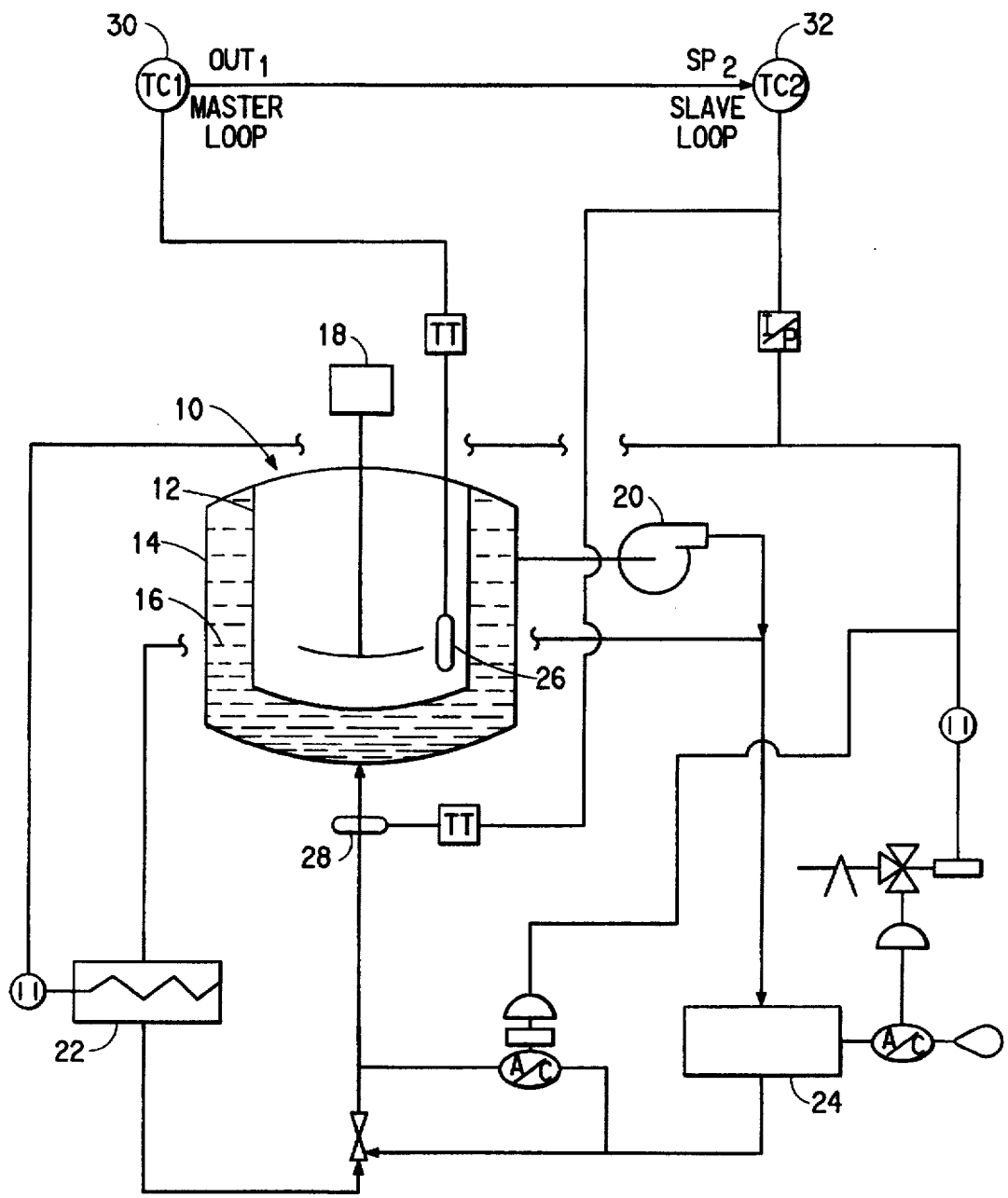
FIG. 1 is cross sectional schematic view of a jacketed batch reactor according to the present invention with cascaded proportional master and slave control loops with bias feedback.

The improved batch reactor control system according to the present invention, how it is made and functions and how the overall method differs from prior art as well as its advantages relative to the prior art can perhaps be best explained and understood by reference to the drawing and by reference to the under lying control algorithm associated with the use of what we have chosen to call "proportional variable reset" (PVR). As illustrated in FIG. 1, the equipment associated with the typical batch chemical reactor, generally designated by the number 10, including the temperature control system will involve reactor vessel or kettle 12 containing the reaction mass (not shown) enclosed or surrounded by a jacket 14 containing a circulating heat-exchange media or fluid 16. The reactor vessel 12 in this particularly preferred illustrated embodiment is further equipped with a stirring mechanism 18 while the heat exchange fluid 16 is withdrawn from the upper portion of the jacket 14 by circulating pump 20. Down stream from the pump 20 the circulating fluid stream is split such as to pass a portion of the heat-exchange fluid through a heater 22 and the rest of the fluid stream through a cooler 24 before recombining the streams adjusted via valves A/C and returning the fluid to the bottom of the jacket 14. It should be appreciated that many alternative variations in the specific details of the equipment including but not limited to vessels, pumps, valves, piping and the like can be employed or not employed, all as generally well known in the chemical arts without, departing from the spirit and scope of providing a jacketed batch reactor with circulating heat-exchange fluid as the phrase is used herein to describe and claim the instant invention.

As further illustrated in FIG. 1, the reactor vessel 12 is equipped with a first temperature sensor 26 which in use monitors the temperature of the reaction mass while simultaneously a second temperature sensor 28 monitors the temperature of the circulating heat-exchange fluid as it enters the lower portion of the jacket 14. It is critical for purposes of this invention that the respective temperature sensors be selected such that they are matched. By this it is meant that the temperature range of the slave (inner) control loop and the temperature range of the master (outer) control loop be equal either through transmitter range selection, internal/external scaling or the like. As can be seen from FIG. 1, the signal from the first sensor 26, corresponding to the temperature of the reactor, is operatively connected to and transmits the temperature (TT) to the master or outer temperature controller 30 while the signal from the second sensor 28, corresponding to the temperature of the jacket, is operatively connected to and transmits the temperature (TT) to the slave or inner temperature controller 32 of a pair of cascaded temperature controllers (again 30 and 32, respectively). A transducer (I/P) transduces the signal from electronic to pneumatic as necessary. As such the process or measured variable for the master control loop is the temperature of the reactor; i.e.; $MV_{1(Reactor\ Temp)}$. Similarly, the process or measured variable for the slave control loop is the temperature of the jacket; $MV_{2(Jacket\ Temp)}$. Again the pair of controllers 30 and 32 are operatively connected and thus arranged in a cascade control architecture with reactor jacket temperature as the inner or slave loop and reactor temperature as the outer or master loop. The feed back signal in the master controller, which is normally equal to controller output ($OUT_1$) or slave loop process Variable ($MV_2$), is for purposes of this invention set equal to master loop process variable ($MV_1$) or the master controller set point ($SP_1$) or other parameter that tracks or parallels one of these variables. As such and for purposes of claiming this invention the reference to setting the feedback for the master loop ($FB_1$) equal to the measured variable ($MV_1$) is intended to include the reactor temperature and equivalent parameters such as the reactor setpoint or the like.

More specifically and for further clarity, in the generic PID controller algorithm the output equals a controller gain times the difference between the set point and the measured process variable plus the value of the external feed back variable as represented by:

OUTPUT=K(SP−MV)+FB where;
K=controller gain
SP=set point on controller
MV=measured process variable on controller
FB=external feed back variable Thus in the case of the instant cascaded pair of controllers the corresponding generic algorithm for the "Proportional with Variable Reset" is represented as:
$TC_2$=Slave Loop
$OUT_2=K_2(SP_1-MV_2)+FB_2$
and
$TC_1$=Master Loop
$OUT_1=K_1(SP_1-MV_1)+FB_1$
where
$FB_1=MV_1$(Reactor Temp) or $FB_1=SP_1$(Reactor SP)
and thus
$OUT_1=K_1(SP_1-MV_1)+MV_1$ or $OUT_1=K_1(SP_1-MV_1)+SP_1$
but $MV_1$ becomes equal to $SP_1$ at the control point thus at temperature hold subsequent to optimum rapid temperature rise
$OUT_1=K(zero)+MV_1$ or $OUT_1=K=(zero)+SP_1$
and
$OUT_{1(Jacket\ SP)}=MV_{1(Reactor\ Temp)}$ or $OUT_1$(Jacket SP)= $SP_1$(Reactor SP)

In other words, in the embodiment illustrated in FIG. 1 wherein the feedback for the master loop, $FB_1$, is set equal to the measured variable, $MV_1$, the $OUT_1$ (which is the Jacket SP, see tie line in FIG. 1 between 30 and 32) becomes $MV_1$ at temperature hold subsequent to optimum rapid temperature rise and this value is the reactor temperature at that hold. Similarly for the alternate embodiment represented by the above alternate equations wherein the feedback, $FB_1$, is set equal to the master controller set point, $SP_1$, the $OUT_1$ at temperature hold becomes $SP_1$ as well as the jacket SP which again is the desired targeted reactor temperature at hold.

Again in contrast, normal batch control would set $FB_1=OUT_1$ or $MV_2$.

which would not accomplish the end result that the PVR algorithm achieves. By way of further explanation an ideal control would be to keep $OUT_1$ at a maximum until the reactor reaches the required setpoint and then set the jacket temperature setpoint at the kettle setpoint. However, on a pragmatic level this concept would require extraordinary effort using contemporary cascaded PID controllers. In comparison the instant invention approaches this and involves merely tuning the system by adjusting one gain setting. In the following Example there is a temperature ramp step from 200° C. to 230° C. In the ideal case the $OUT_1$ would be kept at a maximum of perhaps 300° C. by setting $SP_2$ on $TC_2$ at this value until the reactor reaches the required setpoint 230° C. and then one would reset $OUT_1$ to 230° C. as represented by:
if $MV_{1(Reactor\ temp)}$ not=230° C.
then keep $OUT_{1(Jacket\ SP)}$=300° C.
and
if $MV_{1(Reactor\ temp)}$=230° C.
then set $OUT_{1(Jacket\ SP)}$=300° C.
According to the instant PVR the
$OUT_1=K_1(SP_1-MV_1)+MV_1$
and at the control point
$MV_1=SP_1$
thus
$OUT_1=K(zero)+MV_1$
or more specifically
$OUT_{1(Jacket\ SP)}=MV_{1(Reactor\ Temp)}$.
and

OUT$_1$=230° C.

In other words, the algorithm associated with the instant control system inherently mimics the ideal state while the only operator adjustment is the controller gain. It is well within the skill of the operator to adjust gain based on experience derived relative to the particular reaction to be rim. One merely determines empirically the gain setting necessary to achieve simultaneously optimum temperature rise and/or fall without overshoot and/or undershoot. Again a concept well within any practitioner's skills.

Figure 3:
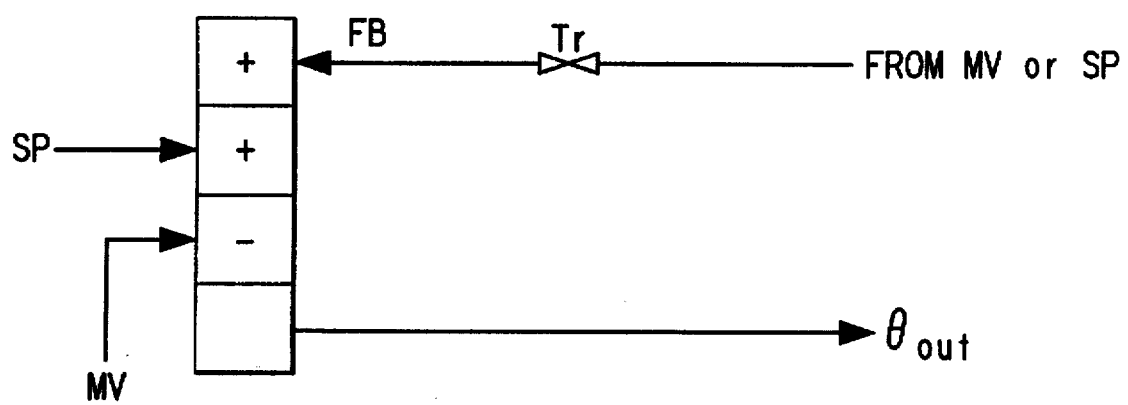
FIG. 3 is a schematic view of a pneumatic controller alternative embodiment according to the present invention with proportional variable reset (i.e., with bias feedback) to be used in the cascaded master control loop.

The actual choice and installation of the cascade controller is not viewed to be critical in that it is felt that any such device as generally practiced in the art can be employed. Preferably a general purpose PID digital cascade controller is to be employed with reassignment of the Master Loop feedback as described above. It should be further appreciated that a corresponding analog electronic controller or a pneumatic controller can be and has been successfully implemented according to the PVR algorithm. One specific embodiment of such a configuration is schematically illustrated in FIG. 3 wherein the K, MV, SP and FB have the same meaning as illustrate above and the general output, $\theta_{out}$, is given by:

$$\theta_{out}=K(SP-MV)+FB.$$

Commercially available controllers which have been successfully used in the improved temperature control system according to the present invention include Moore Products' 352 Single Loop Digital Controller, Moore Products' analog pneumatic controller and Honeywell's TDC 3000 Distributed Control System.

EXAMPLE

To further illustrate and evaluate the improved batch reactor temperature control method employing the cascaded master and slave control loops with variable bias feedback according to the present invention, a five hundred gallon commercial jacketed batch chemical reactor arranged and configured as shown in FIG. 1 and as described herein was employed to perform a polymerization reaction. This polymerization reaction produces a commercial polymer that is used as a fiber finish additive commonly applied to polyester fabrics as a slickener and commercially available from E. I. du Pont de Nemours and Company under the tradename Zelcon®. The commercial scale batch reaction is known to be troublesome in that temperature variations during reaction and lack of consistent reproducibility of temperature from batch to batch leads to variations in molecular weight distribution and viscosity. This in tern represents an inability to meet product quality specifications on a consistent and reproducible basis.

As configured, the commercial scale 500 gallon batch reactor was characterized as having a heat input capability 2.5 times the heat removal capability with a 30 minute dead time to heating or cooling changes. Thus the heating and cooling ramps took hours (see FIG. 2a, 2b and 2c). The heating was by an electric heater which had two elements and cooling and heating were split range. The control requirements for the reaction involved heating the reaction mass to a minimum of 100° C. as fast as possible followed by the manual addition of a charge of Carbowax. This took approximately 1 hour and 45 minutes. The reaction mass was then heated to 200° C. as fast as possible which took another 2 hours. A temperature hold at 200° to 205° C. for 1 hour followed the second temperature ramp after which the reaction mass was again heated with application of vacuum (see endotherm of FIG. 2a) as fast as possible to 230° C. which involved another 3 hours. At this point the reactor was held at 230°±2° C. (see FIG. 2b) until the desired viscosity set point is reached. This typically takes from 8 to 12 hours and is the most critical control step for product quality. The reactor was then cooled to 180° C. as fast as possible which took 7 hours after which the product was transferred from the reactor.

Figure 2A:
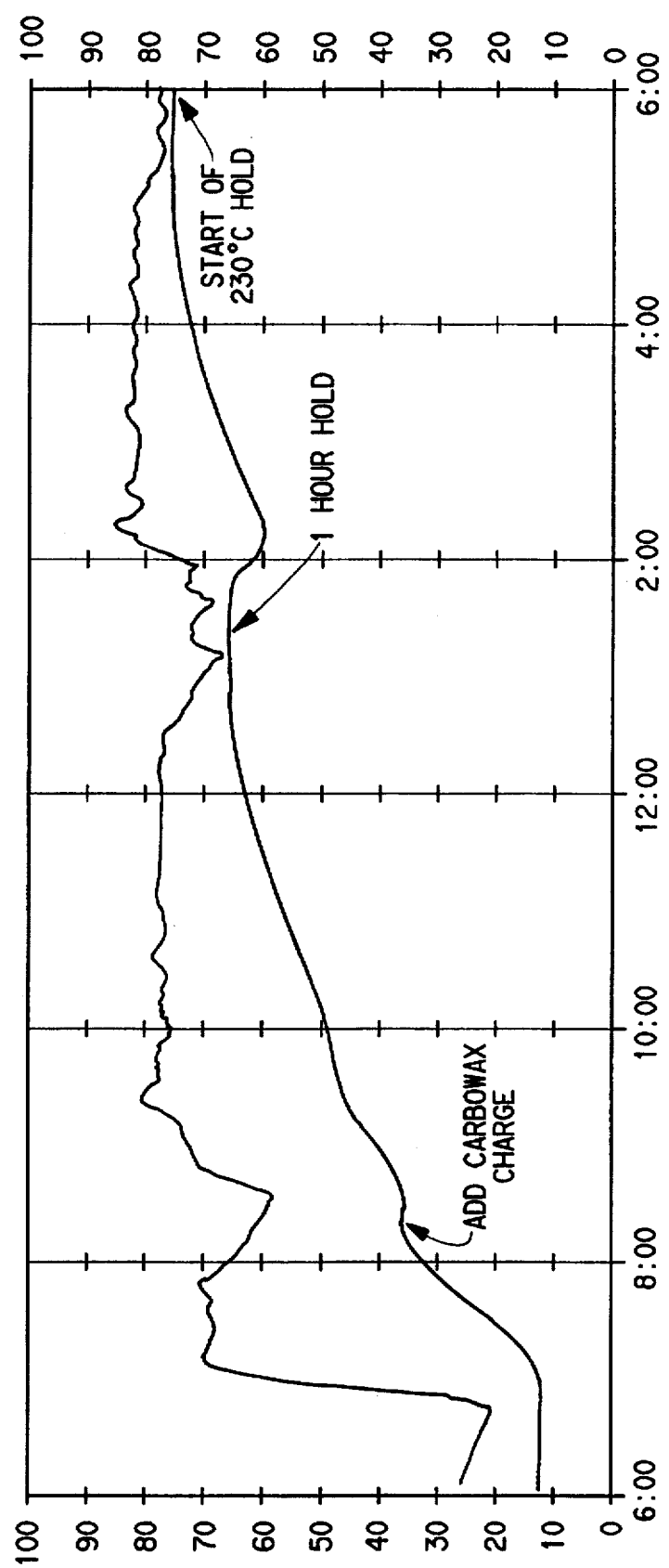
FIG. 2a is the initial two stage start up and temperature rise.
Figure 2B:
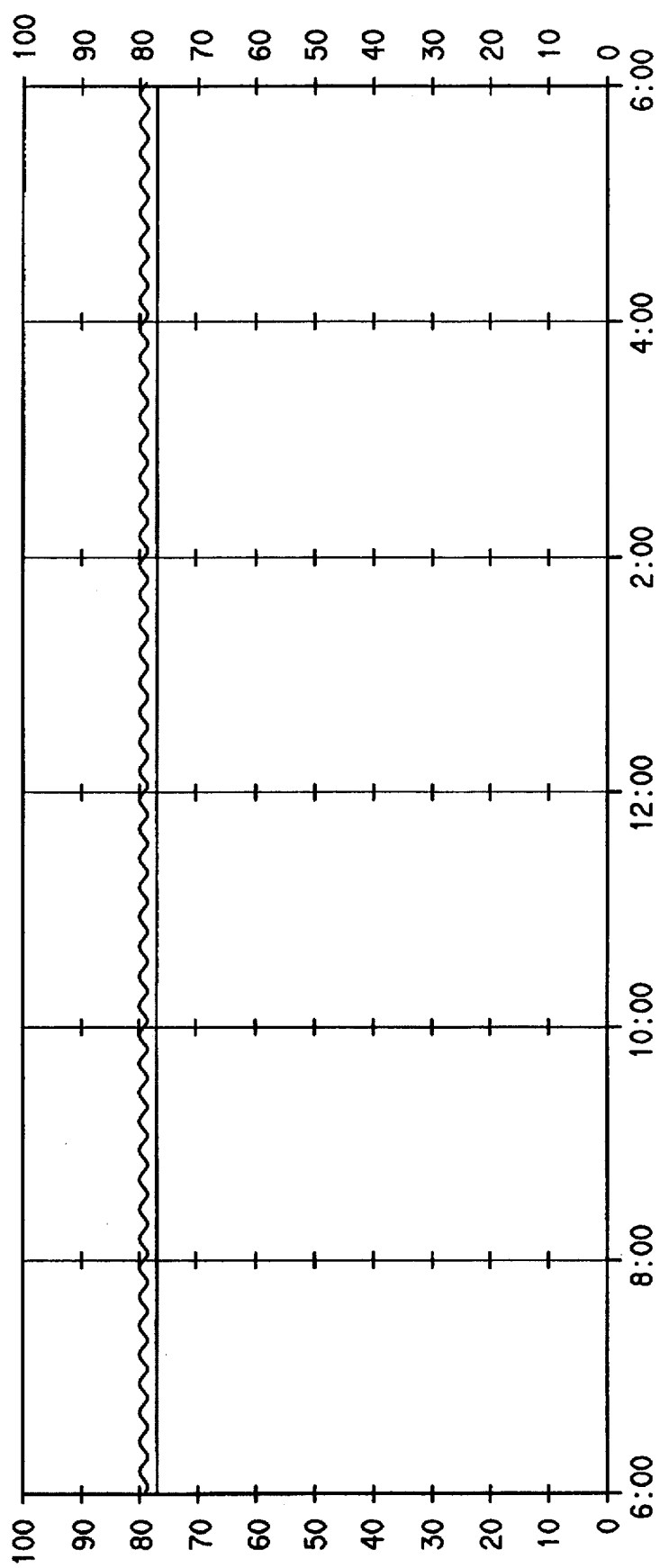
FIG. 2b is the sustained temperature hold and FIG. 2c is the cool down.
Figure 2C:
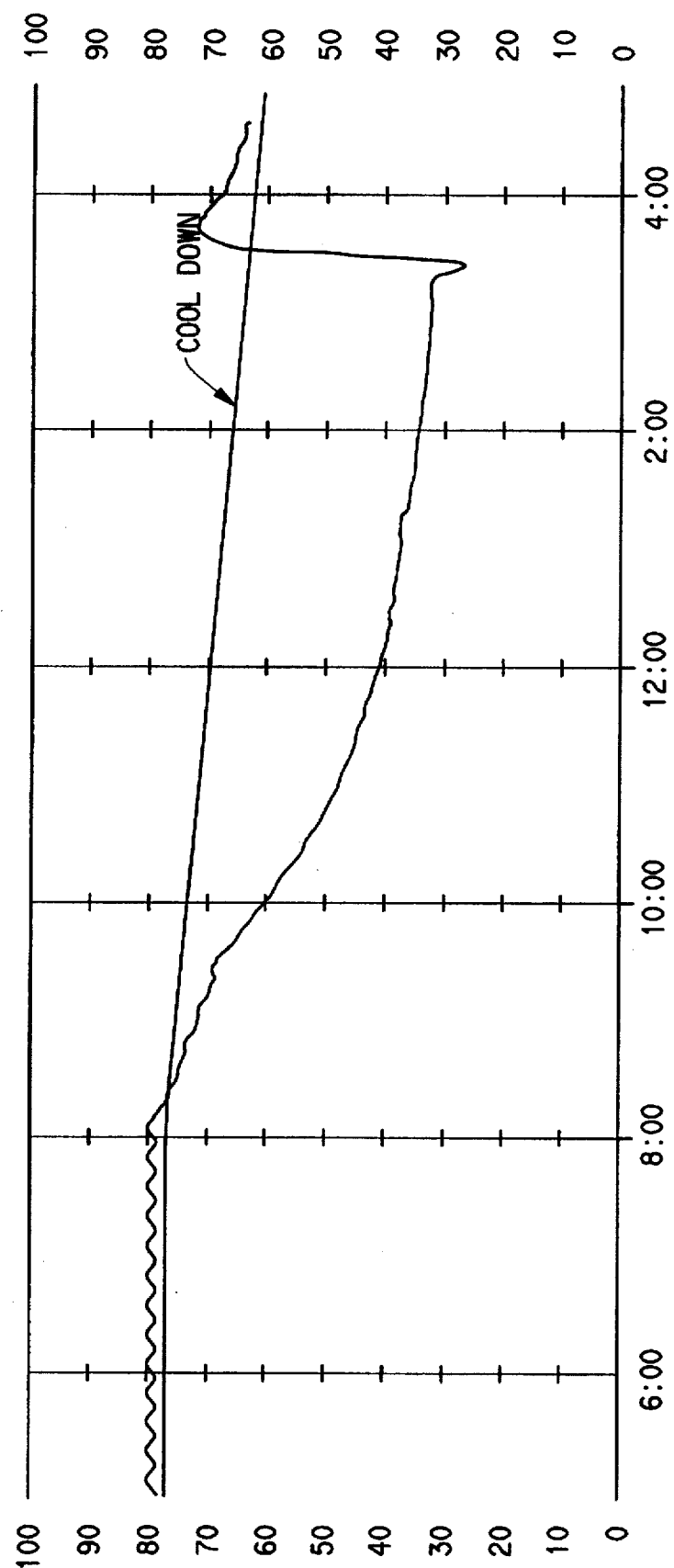

As shown in the temperature recordings of FIG. 2a, 2b and 2c, the temperature rise-times of the reactor (the lower smooth curve) were very rapid (i.e., optimal) and the temperature control during the critical hold times (in particular see FIG. 2b) were very flat and stable (i.e., again optimal). More importantly, the overall reaction process and product quality has been found to be highly reproducible particularly when compared to the previous history of such reaction. Also, implementing the process using pneumatic circuits rather than electric has been shown to give virtually identical results again indicating that the use of the proportional variable reset concept (i.e., in this case the temperature of the reactor as the feedback to the master temperature controller) significantly improves the temperature control of the batch reactor.

The advantages and benefits associated with the improved batch reactor temperature control system according to the instant invention are felt to be numerous and significant. For example, the improved temperature control system with proportional variable reset allows for the heating as rapidly as the possible during temperature ramp steps yet simultaneously allows for virtually no temperature overshoot or undershoot. In other words, the proportional with variable bias algorithm will heat and cool at the maximum heat input and removal rate of the process equipment as rapidly as process dynamics allow. It will maintain a temperature control setpoint during hold period with no over shoot or undershoot after maximum heating and cooling ramp. The system affords the operator the ability to time the temperature control by setting only one parameter (i.e., mining only one control knob) which leads to simplicity and ease of operation. Also, the product quality, ease of meeting production specifications and reproducibility is markedly improved particularly for reaction that are highly sensitive to temperature fluctuations during manufacturing. These advantages and benefits translate into economic savings in use of human resources, equipment utilization (such as reduced cycle time) and reduction of off-spec product.

Having thus described and exemplified the invention with a certain degree of particularity, it should be appreciated that the following claims are not to be so limited but are to be afforded a scope commensurate with the wording of each element of the claim and equivalents thereof.

We claim:

1. A method of controlling the temperature of a batch reactor comprising the steps of:

(a) providing a jacketed batch reactor with circulating heat-exchange fluid in the jacket surrounding the reactor and a reaction mass in the reactor, a means for heating said circulating heat-exchange fluid, a means for cooling said circulating heat-exchange fluid, a means for circulating said heat-exchange fluid to supply or withdraw heat from the reaction mass, a pair of matched temperate sensors, wherein the first temperature sensor monitors the temperature of said reaction mass in said reactor and the second temperature sensor monitors the temperature of the heat-exchange fluid in the jacket and both of said temperature sensors are operative over the same full temperature range of the reaction, a master and slave proportional controller means arranged in a cascaded relationship, wherein said master controller is responsive to the temperature of said reaction mass by operative communication with said first temperature sensor and wherein said slave controller is responsive to the temperature of said heat-exchange fluid by operative communication with said second temperature sensor; and (b) utilizing a cascaded master and slave controller means for controlling the temperature of said reactor wherein the temperature of the reactor monitored by said first temperature sensor serves as the measured variable, $MV_1$, in the master loop and the jacket temperature monitored by said second temperature sensor serves as the measured variable, $MV_2$, in the slave loop and the feedback for the master loop, $FB_1$, is set equal to said measured variable, $MV_1$, or to the master controller set point, $SP_1$, thus creating a proportional variable reset.

2. A method of controlling the temperature of a batch reactor according to claim 1 wherein said controller means further comprises a digital electronic controller.

3. A method of controlling the temperature of a batch reactor according to claim 1 wherein said controller means further comprises a pneumatic controller.

4. A method of controlling the temperature of a batch reactor according to claim 1 wherein said controller means further comprises an analog electronic controller.

* * * * *